(12) United States Patent
Cieslinski

(10) Patent No.: US 9,019,382 B2
(45) Date of Patent: Apr. 28, 2015

(54) DIAGNOSIS UNIT FOR AN ELECTRONIC CAMERA AND CAMERA SYSTEM

(75) Inventor: Michael Cieslinski, Ottobrunn (DE)

(73) Assignee: Arnold & Richter Cine Technik GmbH & Co. Betriebs KG (DE)

( * ) Notice: Subject to any disclaimer, the term of this patent is extended or adjusted under 35 U.S.C. 154(b) by 841 days.

(21) Appl. No.: 12/898,477

(22) Filed: Oct. 5, 2010

(65) Prior Publication Data

US 2011/0242331 A1    Oct. 6, 2011

(30) Foreign Application Priority Data

Oct. 13, 2009   (DE) .................. 10 2009 049 203

(51) Int. Cl.
*H04N 17/02* (2006.01)
*H04N 17/00* (2006.01)
*H04N 5/225* (2006.01)

(52) U.S. Cl.
CPC ........... *H04N 17/002* (2013.01); *H04N 5/2252* (2013.01)

(58) Field of Classification Search
USPC .......................................... 348/187, 188, 180
See application file for complete search history.

(56) References Cited

U.S. PATENT DOCUMENTS

| | | | | |
|---|---|---|---|---|
| 799,767 | A * | 9/1905 | Weisenborn | 242/388.3 |
| 5,969,372 | A * | 10/1999 | Stavely et al. | 250/559.42 |
| 6,377,300 | B1 * | 4/2002 | Morris et al. | 348/207.99 |
| 6,791,608 | B1 * | 9/2004 | Miyazawa | 348/246 |
| 7,626,610 | B2 * | 12/2009 | Toledano et al. | 348/187 |
| 2004/0047625 | A1 * | 3/2004 | Ito et al. | 396/429 |
| 2004/0202464 | A1 * | 10/2004 | Miyasaka et al. | 396/529 |
| 2008/0075452 | A1 * | 3/2008 | Parkola et al. | 396/429 |
| 2009/0295935 | A1 * | 12/2009 | Uchiyama | 348/222.1 |
| 2009/0316002 | A1 * | 12/2009 | Ishiga | 348/187 |
| 2010/0002103 | A1 * | 1/2010 | Shintani | 348/251 |
| 2010/0013962 | A1 * | 1/2010 | Hamano | 348/241 |
| 2010/0053357 | A1 * | 3/2010 | Ikeda | 348/222.1 |
| 2010/0073548 | A1 * | 3/2010 | Meurrens | 348/345 |
| 2010/0074554 | A1 * | 3/2010 | Gyotoku | 382/275 |
| 2010/0079625 | A1 * | 4/2010 | Miwa | 348/241 |

(Continued)

FOREIGN PATENT DOCUMENTS

| | | |
|---|---|---|
| DE | 10210327 A1 | 9/2003 |
| DE | 10228882 A1 | 2/2004 |

(Continued)

OTHER PUBLICATIONS

Examination Report of GB 1017158.5 dated Sep. 13, 2011.
German Search Report dated Aug. 26, 2010 and translation thereof.

*Primary Examiner* — Jefferey Harold
*Assistant Examiner* — Humam Satti
(74) *Attorney, Agent, or Firm* — Amster, Rothstein & Ebenstein LLP

(57) ABSTRACT

A diagnosis unit for an electronic camera comprises a housing and a coupling device for coupling the diagnosis unit to an objective connection of a camera or to a camera objective, wherein the coupling device surrounds a light exit opening of the housing. The diagnosis unit further comprises at least one light source arranged in the housing for outputting a diagnosis illumination through the light exit opening, and an interface for electrically connecting the diagnosis unit to a camera. A camera system comprises a diagnosis unit and an electronic camera having an image sensor.

33 Claims, 2 Drawing Sheets

(56) References Cited

U.S. PATENT DOCUMENTS

Figure 1:
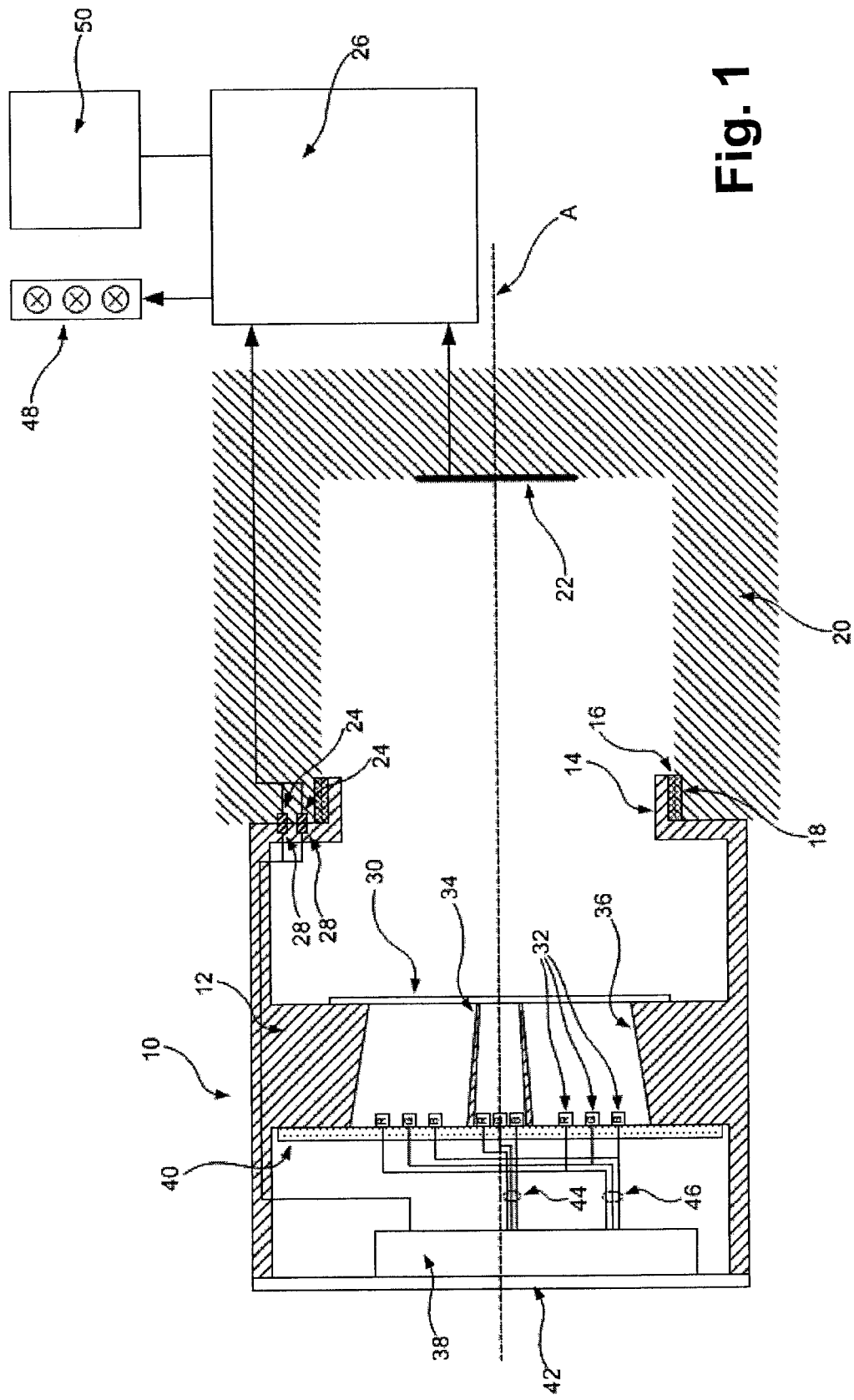

| | | | |
|---|---|---|---|
| 2010/0165170 A1* | 7/2010 | Kawai et al. | 348/335 |
| 2010/0188841 A1* | 7/2010 | Rahbar-Dehghan | 362/109 |
| 2010/0194895 A1* | 8/2010 | Steinberg et al. | 348/187 |
| 2010/0259622 A1* | 10/2010 | Steinberg et al. | 348/187 |
| 2010/0259623 A1* | 10/2010 | Knoedgen et al. | 348/187 |
| 2010/0325825 A1* | 12/2010 | Kawai | 15/94 |
| 2011/0074983 A1* | 3/2011 | Bush | 348/241 |
| 2012/0013772 A1* | 1/2012 | Ishiga | 348/241 |

FOREIGN PATENT DOCUMENTS

| | | |
|---|---|---|
| DE | 19983110 B4 | 6/2006 |
| GB | 799767 | 8/1958 |
| JP | 11249217 A | 12/1997 |
| JP | 2003060962 A | 8/2001 |
| JP | 2003215689 A | 1/2002 |

* cited by examiner

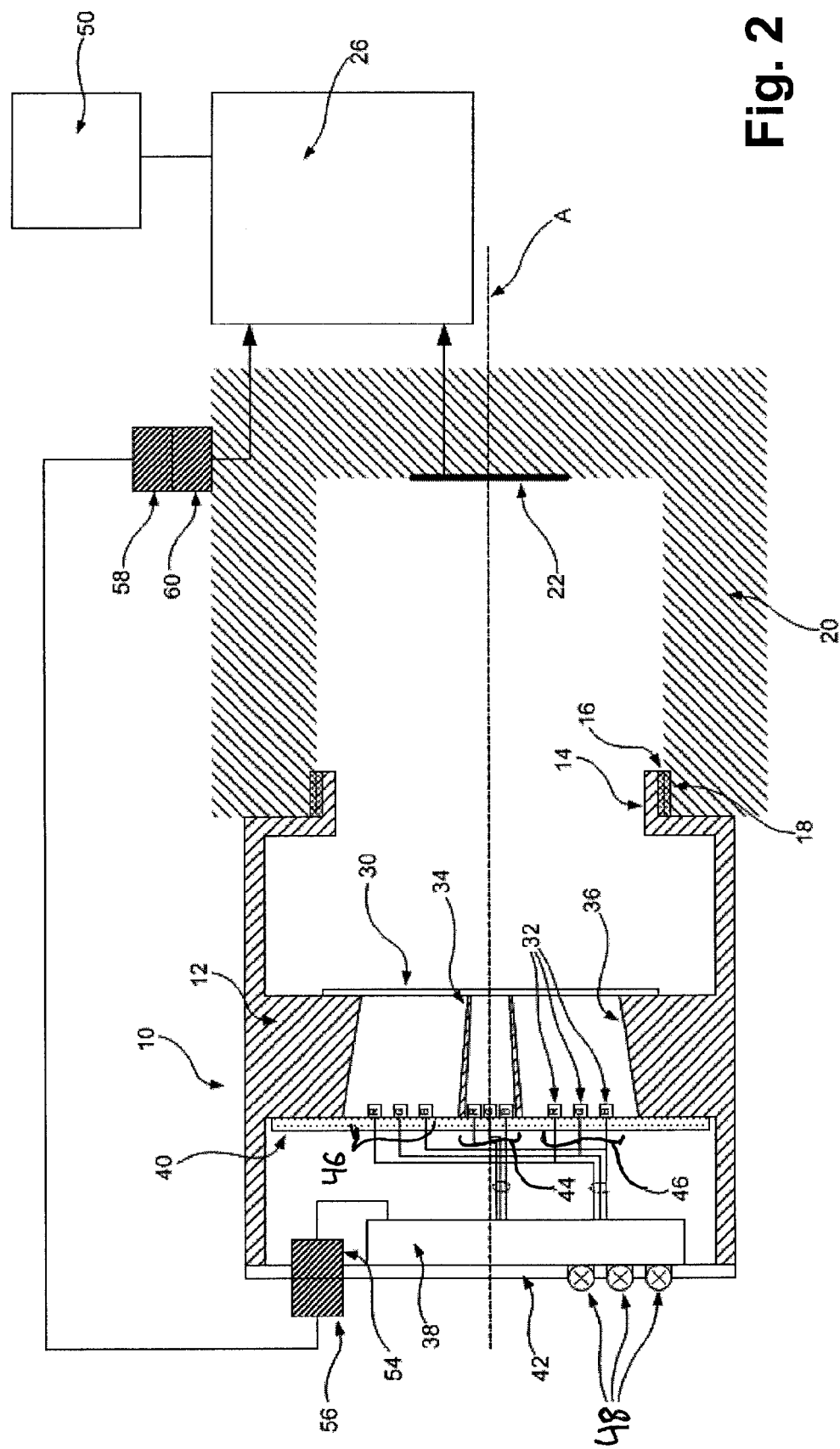

DIAGNOSIS UNIT FOR AN ELECTRONIC CAMERA AND CAMERA SYSTEM

The present invention relates to a diagnosis unit for an electronic camera.

Such electronic cameras are generally known and are increasingly used in the professional area. They are in particular used as still image cameras in photography and as motion picture cameras for film production. Very high costs for actors and for the production team in particular arise as a rule in the production of cinema movies. It is therefore very important there that the cameras used work faultlessly.

In defective electronic cameras, above all those faults are particularly disadvantageous which are not immediately recognized. Whereas a total failure of an electronic camera is easily recognizable and the respective camera is replaced, faults which only cause minor image interference and are due e.g. to dirt on the sensor, a change in the characteristic of electronic components or increased noise may possibly initially remain unrecognized.

Such image interference can nevertheless become clearly visible on a projection of the cinema movie on a large screen and may even be amplified by subsequent image corrections carried out in postproduction.

When image interference occurs, the affected images must be subsequently manually corrected in a laborious process. In the worst case, the shoot will have to be repeated, which is associated with considerable additional costs.

Usually, the correct function of an electronic camera is verified in that defined patterns are filmed with the camera. They typically contain different, calibrated color charts, patterns with a high contrast extent and homogeneously illuminated surfaces. For example, an Ulbricht sphere with large-format patterns is used which is filmed in a darkened room.

Such equipment is, however, frequently too bulky to be used at the filming location. In addition, special analysis software which requires the presence of a computer and special technical knowledge of the operator for its operation is required for the evaluation of the taken test data, in particular for recognizing errors in signal processing.

It is therefore the object of the invention to provide a diagnosis unit for an electronic camera which is simple in handling and has a compact construction.

This object is satisfied by the features of claim 1 and in particular by a diagnosis unit for an electronic camera, comprising a housing, a coupling device for coupling the diagnosis unit to an objective connection of a camera or to a camera objective, wherein the coupling device surrounds a light exit opening of the housing, further comprising at least one light source arranged in the housing for outputting a diagnosis illumination through the light exit opening, and comprising an interface for electrically connecting the diagnosis unit to a camera.

Such a diagnosis unit can be coupled to a camera instead of the objective or can be set onto a camera objective. The diagnosis unit can be used at any location and makes the conventional filming of large-format patterns in a darkened room superfluous.

Since the diagnosis unit has an interface for an electrical connection of the diagnosis unit to a camera, it is possible to supply the diagnosis unit with electrical energy for the operation of the light source. Alternatively or additionally it is possible to transfer electric control signals between the diagnosis unit and a connected camera.

The diagnosis unit is preferably configured for generating different illumination states. This makes the use of different patterns superfluous which must otherwise be provided for recognizing various types of image interference.

In accordance with a preferred embodiment, the interior of the housing is screened against light incident from the outside at least when a camera is connected. The diagnosis unit can thereby be used under any desired environmental conditions. A darkening of the environment is not necessary.

At least one first light source and one second light source are preferably arranged in the housing and are controllable such that the diagnosis illumination can be generated with at least one first aperture and one second aperture. In this respect, the first aperture is preferably selected such that an image sensor of a camera coupled to the diagnosis device can be illuminated by essentially directed light and the second aperture is preferably selected such that the image sensor can be illuminated by substantially diffuse light. If there is dust or dirt particles on the surface of the image sensor, they cast a visible, relatively sharp shadow, which becomes visible as a dark point in the image, with a directed illumination with a small aperture. If, however, the sensor is diffusely illuminated with the large aperture, this shadow is no longer visible or is at least much less pronounced. The presence of dust particles or dirt particles can be recognized and distinguished from artifacts of the image sensor of a similar appearance by the comparison of two images taken with different apertures.

Alternatively to this, by a corresponding selection of the respective aperture or light source, the image on the basis of a diagnosis illumination with a substantially directed characteristic can be compared with the image on the basis of a diagnosis illumination with a characteristic different herefrom, but likewise substantially directed.

Further light sources can also be provided such that the diagnosis illumination can be generated with more than two different apertures.

In accordance with another advantageous embodiment, the at least one light source has at least one illuminant arrangement which in each case includes a plurality of illuminants, in particular three illuminants, in particular light emitting diodes (LEDs), of which each is configured for transmitting light in a different wavelength range. For example, each illuminant arrangement has a red light emitting diode, a green light emitting diode and a blue light emitting diode which are preferably individually controllable. The transfer characteristics of the camera can thereby be checked for different color values and for white.

In accordance with a further preferred embodiment of the invention, the diagnosis unit has a diffuser plate for scattering the light emitted by the first and/or second light source in the direction of the light exit opening.

The diffuser plate supports the diffusion of the light transmitted by the light source.

The invention further relates to a camera system, comprising a diagnosis unit and an electronic camera with an image sensor, the diagnosis unit comprising a housing and a coupling device for coupling the diagnosis unit to an objective connection of the camera or to a camera objective connected to the camera, wherein the coupling device surrounds a light exit opening of the housing, the diagnosis unit further comprising at least one light source arranged in the housing for outputting a diagnosis illumination through the light exit opening and an interface for electrically connecting the diagnosis unit to the camera, wherein the camera is configured to control the diagnosis unit. The diagnosis unit can be configured as in any one of the above-described embodiments.

In accordance with a preferred embodiment of the camera system, the camera has an evaluation device which is made for the evaluation of test images generated by means of the diagnosis unit and of the image sensor.

It is particularly preferred if the evaluation device is configured automatically to recognize a diagnosis unit connected to the camera and subsequently to operate automatically in accordance with a diagnosis scheme presettable by the evaluation device. The camera in this respect recognizes if a diagnosis unit in connected instead of an objective and then starts, automatically or on call, a function check without any further interventions of an operating being necessary. The result of this function check can be signaled to the operator by a display at the camera or at the diagnosis unit.

Further advantageous embodiments of the invention are set forth in the dependent claims, in the description and in the drawing.

The invention will be described in the following with reference to embodiments and to the drawing. There are shown:

FIG. 1 a schematic sectional view of a first embodiment of a diagnosis unit in accordance with the invention which is coupled to a camera; and FIG. 2 a schematic sectional view of a second embodiment of a diagnosis unit in accordance with the invention which is coupled to a camera.

A camera system in accordance with FIGS. 1 and 2 includes a diagnosis unit 10 in accordance with the invention and a camera 20 (only shown in part). The diagnosis unit has a light-proof housing 12 with a light exit opening 14 in whose region a coupling device 16, only shown schematically, is provided for mechanically coupling the diagnosis unit 10 to an objective connection 18 (i.e. lens mount) of the camera 20. The coupling device 16 and the objective connection 18 can be generally known connection systems, e.g. objective bayonet or screw thread.

In the first embodiment in accordance with FIG. 1, the camera 20 has an electric interface 24 in the region of the objective connection 18 which includes a plurality of electric contacts of which here only two are shown, however, for reasons of clarity. Different object parameters of objectives configured for this purpose, for example the objective type or settings for the diaphragm or focus, can be read out via such an interface 24. In the camera system shown in FIG. 1 comprising a diagnosis unit 10 and a camera 20, this interface 24 is additionally also configured for the control and power supply of the diagnosis unit 10, i.e. the camera system is configured so that the diagnosis unit 10 and the camera 20 can communicate via the interface 24. For this purpose, the housing 12 of the diagnosis unit 10 has a plurality of contact elements 28 in the region of the coupling device 16 which form a complementary interface to the interface 24 of the camera and cooperate with the contacts of the interface 24 in the coupled state.

The contact elements 28 are connected to the input of a control device 38, said input being arranged at a rear wall 42 of the housing 12. Both a supply voltage and control signals are transmitted to the control device 38 via the interface 24 and the contact elements 28.

In the second embodiment in accordance with FIG. 2, the camera 20 does not have an electric interface in the region of the objective connection. Instead, a plug connector 60 is provided at the housing of the camera and is connected via a cable provided with corresponding plug connectors 56, 68 and a plug connector 54 arranged at the rear side of the diagnosis unit 10 to the control device 38 so that an electric coupling to the camera 20 can also take place in this case.

In both embodiments, the control device 38 has a plurality of outputs to each of which a plurality of light emitting diodes 32 are connected which are arranged in a manner still to be explained in more detail on an illuminant carrier 40 spaced apart from the rear wall 42. A tubular first diaphragm 34 which is arranged coaxial to the optical axis A and converges a little in the direction of the light exit opening 14 is furthermore provided on the illuminant carrier 40. A tubular second diaphragm 36 which is made in one piece with the housing 12 bounds a ring-shaped space at whose center the first diaphragm 34 is provided and which likewise converges somewhat in the direction of the light exit opening 14. The wall surfaces of the diaphragms 34, 36 bounding the ring-shaped space are inclined with respect to the optical axis A in the direction of the image sensor 22 of the camera 20. The light exit surfaces of the diaphragms 34, 36 are in the same plane in which a diffuser plate 30 for the homogenization of the light output by the light emitting diodes 32 is also provided.

In the space bounded by the first diaphragm 34 on the illuminant carrier 40 a plurality of light emitting diodes 32 are arranged of which here only one red, one green and one blue light emitting diode 32 are shown by way of example which together form a first illuminant arrangement 44. Accordingly, a plurality of second illuminant arrangements 46 are provided on the illuminant carrier 40 within the ring-shaped space between the first diaphragm 34 and the second diaphragm 36, said second illuminant arrangements equally including a plurality of light emitting diodes 32 of which here also only one red, one green and one blue light emitting diode 32 are shown by way of example. Each illuminant arrangement 44, 46 can also have a plurality of light emitting diodes 32 (e.g. four) of the same color which are in particular connected in series. To further increase the illumination, a plurality of these light diode series can also be connected in parallel.

Due to the sectional view, only two of the second illuminant arrangements 46 are visible in the Figures. To achieve an illumination which is as uniform as possible, a plurality of the second illuminant arrangements 46, for example four, six or eight, can be provided on the illuminant carrier 40 (preferably at the same distance from the optical axis A and at the same angular interval from one another). Alternatively to this, a single second illuminant arrangement 46 can be provided.

Each light emitting diode 32 of the first illuminant arrangement 44 can be connected to the control device 38 via a separate line so that a separate change of the brightness is possible for each light emitting diode 32 by changing the operating current and/or by changing the mark space ratio of a clocked operating current. The same applies accordingly to the light emitting diodes 32 of the second illuminant arrangement 46. Alternatively, the light emitting diodes 32 of the same color of the illuminant arrangement 44 or 46 can be controlled via a respective common line, i.e. a color-selective controller can be provided for each illuminant arrangement 44 and 46 respectively, as is shown in the Figures. In accordance with a further alternative, it is possible to control all the light emitting diodes 32 of an illuminant arrangement 44 or 46 via a common line.

The diagnosis unit 10 thus simulates an objective in that the diffuser plate 30 is arranged at a point which corresponds to the exit pupil of an objective connected to the camera 20 in normal operation. The illumination through an objective can thereby be simulated by control of the first illuminant arrangement 44 for illuminating with a small aperture or, alternatively or additionally, by control of the second illuminant arrangement 46 for illuminating with a large aperture, said objective being operated either with a closed diaphragm (e.g. f-stop 16.0) or with an open diaphragm (e.g. f-stop 2.0). The diagnosis illumination generated by the diagnosis unit 10 acts directly on the image sensor 22 of the camera 20, i.e. without refraction at an optical camera system.

The camera 20 has an evaluation device with an input for signals of the image sensor 22. Devices, not shown here, for signal processing such as amplifiers and/or analog/digital converters can be connected before the evaluation device 26.

The evaluation device 26 is connected to the control device 38 via the interface 24 and the contact elements 28 (FIG. 1) or via the plug connectors 54, 56, 58, 60 (FIG. 2). Test images which were generated by means of the diagnosis unit 10 and the image sensor 22 can be evaluated using the evaluation device. The evaluation device 26 can furthermore output control commands to the control device 38. It is thus possible that the evaluation device 26 operates the diagnosis unit 10 in accordance with a diagnosis scheme in different operating modes still to be explained in the following to generate different illumination states and in the meantime receives and evaluates corresponding image data from the image sensor 22. The diagnosis scheme can, for example, be preset by a diagnosis program which can be stored in the evaluation device 26.

Alternatively, it is also possible that the diagnosis scheme is preset individually by an operator via an operating device 50. Only individual diagnosis functions can in particular be carried out.

Furthermore, the evaluation device 26 can be made automatically to recognize the coupling of a diagnosis unit 10 to the camera 20 by means of the interface 24 (FIG. 1) or on the basis of a closed cable connection via the plug connector 54, 56, 58, 60 (FIG. 2) and then to carry out a function test of the camera in accordance with a stored diagnosis program. In this respect, the diagnosis unit 10 can generated different illumination states after one another which are taken by the image sensor 22 and are transferred as corresponding test images to the evaluation unit 26. A synchronization of an illumination state with a taking of an image can take place both by the camera 10, in particular by the evaluation device 36, and by the control device 38.

A status display 48 is furthermore connected to a further output of the evaluation device 26 in accordance with FIG. 1. This status display 48 can output status reports or results of the function check via a display, for example, but also via differently colored signals. It is thus e.g. possible that a yellow signal indicates the carrying out of a function check. It can be indicated by means of a green or of a red signal that the function check was concluded with a positive result or with a negative result respectively. The status display 49 is preferably arranged at the diagnosis unit 10 itself, as is shown in FIG. 2. A simpler association of the result is thereby possible for the operator (distinction between camera defect and dirty sensor 22).

Different exemplary function checks will be described in the following which can be carried out using the diagnosis unit 10 in accordance with the invention.

Transfer characteristics for the different colors as well as for white can be determined in that the light emitting diodes 32 of the first and/or second illuminant arrangement 44, 46 are each operated with a different brightness.

Dust particles or dirt particles on the image sensor 22 can be recognized in that two test images are generated in which in each case only one of the first and second illuminant arrangements 44 or 46 respectively is in operation. The first illuminant arrangement 44 thus generates a strongly directed diagnosis illumination with a small aperture together with the first diaphragm 34 on the basis of a very small light exit surface, with dust particles or dirt particles being imaged as sharp on the screen with said small aperture. The second illuminant arrangements 46, in contrast, generate a more diffuse diagnosis illumination, which is incident onto the image sensor 22 with a large aperture, together with the first and second diaphragms 34, 36 on the basis of the substantially larger light exit surface. In this respect, dust particles or dirt particles can be recognized less clearly or not at all in the corresponding test image. Dirt-caused artifacts can be clearly recognized by a corresponding evaluation, for example by subtraction or division of the two test images and can be distinguished from artifacts, e.g. defective pixels or scratches, already present in the image sensor 22 since such artifacts are visible as a rule independently of the illumination conditions. Corresponding tests can also be carried out using such apertures in which the diagnosis illumination is incident onto the image sensor from different directions. This can be realized, for example, in that the upper and the lower illuminant arrangements 46 are operated alternately.

With a uniform illumination of the image sensor 22, for example by operation of both illuminant arrangements 44, 46 with the same brightness, the regularity or uniformity of the image, i.e. the lack of spots, lines, gradients or dot-shaped deviations, can furthermore be checked.

In addition, on the carrying out of function checks spaced apart in time, the stability of the image brightness can be checked in order e.g. to recognize a creeping loss of sensitivity or temperature dependent sensitivity fluctuations of the camera 20.

Furthermore, the pulse response of the image sensor and of the subsequent signal processing can be checked using the diagnosis unit 10 in accordance with the invention in order to recognize any errors which are also called afterglow or lag. For this purpose, an image is first taken with a switched-on diagnosis illumination. The illumination is subsequently switched off and a plurality of so-called dark images are taken without illumination. An afterglow or lag reveals itself in that a dark image taken directly after the preceding illumination still has signal residues of the preceding illumination, wherein the amplitude of the lag can in particular be determined from a difference image which is calculated from the dark image taken directly after the preceding illumination and from a dark image taken at a later time.

Finally, it is also possible to determine the noise level of the camera 20 at different brightnesses and in absolute darkness.

A possibility which is simple and fast to use is provided by the diagnosis unit 10 in accordance with the invention and by the camera system to carry out a function check of the camera 20 to recognize any defects in the image generation at an early time and thus to avoid laborious postprocessing of the image signals or even repeats of the shoot.

REFERENCE NUMERAL LIST 10 diagnosis unit
12 housing
14 light exit opening
16 coupling device
18 objective connection
20 camera
22 image sensor
24 interface
26 evaluation device
28 contact element
30 diffuser plate
32 light emitting diode
34 first diaphragm
36 second diaphragm
38 control device
40 illuminant carrier
42 rear wall 44 first illuminant arrangement
46 second illuminant arrangement
48 status display
50 operating device
54, 56,
58, 60 plug connectors

The invention claimed is:

1. A diagnosis unit for an electronic camera,
comprising a housing (12);
further comprising a coupling device (16) for coupling the diagnosis unit (10) to an objective connection (18) of a camera (20), wherein the coupling device (16) surrounds a light exit opening (14) of the housing (12);
further comprising at least one light source arranged in the housing (12) for outputting a diagnosis illumination through the light exit opening (14); and
comprising an interface (28) for electrically connecting the diagnosis unit (10) to a camera (20), wherein the light source of the diagnosis unit is configured for being controlled by the camera via the interface (28).

2. A diagnosis unit in accordance with claim 1, wherein the diagnosis unit (10) is configured for consecutively generating different illumination states in response to control signals received via the interface.

3. A diagnosis unit in accordance with claim 1, wherein the interior of the housing (12) is screened against light incident from outside with a connected camera (20).

4. A diagnosis unit in accordance with claim 1, wherein at least one first light source and one second light source are arranged and are controllable in the housing (12) such that the diagnosis illumination can be generated using at least one first and one second aperture.

5. A diagnosis unit in accordance with claim 4, wherein the first aperture is selected for outputting the diagnosis illumination with a substantially directed characteristic and the second aperture is selected for outputting the diagnosis illumination with a substantially diffuse characteristic.

6. A diagnosis unit in accordance with claim 4, wherein the first light source is configured for radiating directed light and the second light source is configured for radiating diffuse light.

7. A diagnosis unit in accordance with claim 4, wherein the first light source is arranged in the region of the optical axis (A) of the diagnosis unit and the second light source is arranged outside the first light source and concentrically thereto.

8. A diagnosis unit in accordance with claim 4, wherein the first light source includes at least one first illuminant arrangement (44) and the second light source includes at least one second illuminant arrangement (46).

9. A diagnosis unit in accordance with claim 8, wherein the first illuminant arrangement (44) and the second illuminant arrangement (46) include a plurality of illuminants (32) which are configured for transmitting light in different wavelength ranges, wherein the diagnosis unit (10) has a control device (38) which is configured for an individually different or color-selective control of the illuminants (32).

10. A diagnosis unit in accordance with claim 8, wherein the first light source furthermore includes a first tubular diaphragm (34) which surrounds the first illuminant arrangement (44), wherein the first diaphragm (34) bounds the exit region of the light radiated from the first illuminant arrangement (44),
wherein the first diaphragm (34) preferably also bounds the exit region of the light radiated from the second illuminant arrangement (46).

11. A diagnosis unit in accordance with claim 10, wherein the second light source furthermore includes a second tubular diaphragm (36) which surrounds the second illuminant arrangement (46), wherein the second diaphragm (36) bounds the exit region of the light radiated from the second illuminant arrangement (46),
wherein the second diaphragm (36) is preferably formed by a section of the housing (12).

12. A diagnosis unit in accordance with claim 10, wherein the cross-section of the first and/or of the second diaphragm (34, 36) is rectangular or round.

13. A diagnosis unit in accordance with claim 10, wherein a region bounded by the first and/or the second diaphragms (34, 36) converges in the direction of the light exit opening (14) as the distance from the illuminant arrangements (44, 46) increases.

14. A diagnosis unit in accordance with claim 1, wherein the diagnosis unit has a diffuser plate (30) for scattering the light emitted by the light source in the direction of the light exit opening (14).

15. A diagnosis unit in accordance with claim 14, wherein the diffuser plate (30) is arranged in a plane which corresponds to the plane of the exit pupil of an objective connected to the camera (20).

16. A diagnosis unit in accordance with claim 1, wherein the diagnosis unit (10) is configured for generating a sequence of a plurality of illumination states preferably different from one another.

17. A diagnosis unit in accordance with claim 1, wherein the outputting of a diagnosis illumination and a respective taking of an image can be synchronized with one another, wherein the diagnosis unit (10) preferably comprises a control device (28) configured for carrying out the synchronization.

18. A camera system, comprising a diagnosis unit (10) and an electronic camera (20) having an image sensor (22), the diagnosis unit having a housing (12) and a coupling device (16) for coupling the diagnosis unit (10) to an objective connection (18) of the camera (20), wherein the coupling device surrounds a light exit opening (14) of the housing (12), the diagnosis unit further having at least one light source arranged in the housing (12) for outputting a diagnosis illumination through the light exit opening (14) and an interface (28) for electrically connecting the diagnosis unit (10) to the camera (20), wherein the camera (20) is configured for controlling the diagnosis unit (10) and the light source is configured for being controlled via the interface (28).

19. A camera system in accordance with claim 18, wherein the diagnosis unit (10) can be controlled and/or supplied with an operating current by the camera (20).

20. A camera system in accordance with claim 18, wherein the camera (20) includes an objective connection (18) which includes an interface (34) for the data communication between the camera (20) and the diagnosis unit (10), wherein the diagnosis unit (10) has contact elements (28) for the electric connection to the interface (24).

21. A camera system in accordance with claim 20, wherein the contact elements (28) are provided at the coupling device (16).

22. A camera system in accordance with claim 18, wherein the camera (20) has an evaluation device (26) which is configured for evaluating test images generated by means of the diagnosis unit (10) and by means of the image sensor (22), wherein the camera preferably has an actuation device (50) for actuating the evaluation device (26).

23. A camera system in accordance with claim 22, wherein the evaluation device (26) is furthermore configured for operating the diagnosis unit (10) in accordance with a diagnosis scheme presettable by the evaluation device (26), in particular in accordance with a diagnosis program stored in the evaluation device (26).

24. A camera system in accordance with claim 23, wherein the evaluation device (26) is configured for automatically recognizing the diagnosis unit (10) connected to the camera (20) and subsequently operating it automatically in accordance with the diagnosis scheme.

25. A camera system in accordance with claim 22, wherein the camera (20) and/or the diagnosis unit (10) have a display (48) for displaying a status signal output by the evaluation device.

26. A camera system in accordance with claim 18, wherein the diagnosis unit (10) is configured for generating a sequence of a plurality of illumination states, preferably different from one another, wherein the camera (20) is configured for synchronizing the output of the illumination states with a respective taking of an image.

27. A camera system accordance with claim 18, wherein the diagnosis unit (10) is configured for consecutively generating different illumination states in response to control signals received via the interface.

28. A diagnosis unit for an electronic camera, comprising:
   a housing (12);
   a coupling device (16) for coupling the diagnosis unit (10) to an objective connection (18) of a camera (20), wherein the coupling device (16) surrounds a light exit opening (14) of the housing (12);
   at least one first light source and one second light source arranged in the housing (12) for outputting a diagnosis illumination through the light exit opening (14), the at least one first light source and one second light source being arranged in the housing (12) and controllable such that the diagnosis illumination can be generated using at least one first and one second aperture, the at least one first and one second aperture being different from one another; and
   an interface (28) for electrically connecting the diagnosis unit (10) to a camera (20), wherein the camera controls the diagnosis unit via the interface.

29. A diagnosis unit in accordance with claim 28, wherein the first aperture is selected for outputting the diagnosis illumination with a substantially directed characteristic and the second aperture is selected for outputting the diagnosis illumination with a substantially diffuse characteristic.

30. A diagnosis unit in accordance with claim 28, wherein the first light source is configured for radiating directed light and the second light source is configured for radiating diffuse light.

31. A diagnosis unit in accordance with claim 28, wherein the first light source is arranged in the region of the optical axis (A) of the diagnosis unit and the second light source is arranged outside the first light source and concentrically thereto.

32. A diagnosis unit in accordance with claim 28, wherein the first light source includes at least one first illuminant arrangement (44) and the second light source includes at least one second illuminant arrangement (46).

33. A diagnosis unit in accordance with claim 1, wherein the light source is configured for being provided with an operating current via the interface.

\* \* \* \* \*